United States Patent
Swab et al.

(12) 
(10) Patent No.: US 6,357,368 B1
(45) Date of Patent: Mar. 19, 2002

(54) GROUND WORKING PAIRED ROW FURROW OPENER

(75) Inventors: Gerry Steven Swab, Rosthern; James Wayne Henry, Saskatoon, both of (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/879,696

(22) Filed: Jun. 13, 2001

Related U.S. Application Data

(62) Division of application No. 09/538,179, filed on Mar. 30, 2000.

(51) Int. Cl.[7] .................................................. A01C 5/00
(52) U.S. Cl. ..................... 111/152; 172/722; 172/730
(58) Field of Search ............................... 111/152, 149; 172/699, 700, 727, 726, 721, 722, 723, 724, 725, 730, 732, 733

(56) References Cited

U.S. PATENT DOCUMENTS

| | | | | |
|---|---|---|---|---|
| 4,674,419 A | * | 6/1987 | Kopecky | 111/73 |
| 5,025,736 A | * | 6/1991 | Anderson | 111/152 |

FOREIGN PATENT DOCUMENTS

| CA | 2099555 | * | 2/1993 |
|---|---|---|---|

OTHER PUBLICATIONS

"Flexicoli 'Setting the Standard'" Sales Product Book, vol. 2, dated 1997, photocopy of pp. 45,46 and 47.*

* cited by examiner

Primary Examiner—Christopher J. Novosad
(74) Attorney, Agent, or Firm—John William Stader; Larry W. Miller

(57) ABSTRACT

A ground-engaging paired row furrow forming tool includes a tool body having fore and aft ends with an outer edge defined on each of two opposing sides of the tool body. A furrowing wing is located adjacent each of the opposing sides and protrudes from bottom portions of the tool body. The tool body has lower surfaces including a central front surface portion which is angled upwards towards the fore end and a center passage is defined between the furrowing wings. This passageway is in part defined by a central rear surface portion which is adapted to be substantially aligned fore to aft in a direction of travel T during operation of the ground engaging tool. This paired row opener works well without compromise in a broad range of soil conditions without fouling and enables planting of seed rows spaced widely apart while minimizing soil surface disturbance.

7 Claims, 6 Drawing Sheets

GROUND WORKING PAIRED ROW FURROW OPENER

This is a divisional of co-depending application Ser. No. 09/538,170 filed on Mar. 30, 2000.

FIELD OF THE ART

This invention relates to an agricultural furrow opening tool for planting seeds in paired rows.

DESCRIPTION OF PRIOR ART

It is commonly desirable to perform seeding and fertilizing operations in one pass over a field to be planted. This trend has continued with advancements in low-till and no-till planting implements. Ground working tools have evolved for planting in these no-till and low-till conditions and for improving seed bed utilization. Presently a wide variety of types of ground working tools are available for planting in various soil conditions. These ground working tools are generally categorized as disc types or hoe types. Existing ground working tools designed for working well in certain conditions are not always suitable in other conditions.

For many types of crops such as cereals and oilseeds, planting of the seeds is efficiently achieved by bulk metering. The seeds become generally evenly spaced as seeds are distributed at a seeding rate through distribution lines to ground working tools by which they are planted in rows in the soil. The rows are spaced to achieve the best possible utilization of the soil area, however other factors effect row spacing, such as the need to allow field trash to pass between ground working tools while they are pulled through the soil for planting. This has led to the development of paired row seeding tools which each plant two rows of seed to achieve good seedbed utilization with fewer tools thus also allowing good field trash flow. It is also common that these tools are also designed to simultaneously place a fertilizer row between the seed rows. Research has shown that precise placement of seed at particular spacing along side an appropriate amount and type of fertilizer improves yields.

One such ground working tool is provided according to U.S. Pat. No. 5,025,736 by Anderson. A hoe ground working tool is disclosed which has a narrow leading end for opening a furrow for placement of fertilizer. Trailing the leading end is a press plate which tapers to a wider rearward end from a forward end centered behind the leading end. The press plate is also angled downwards and rearwards from the leading end. It acts to press down on an area wider than the furrow opened for fertilizer for closing the fertilizer furrow and preparing a firm seedbed. It has a wear strip along each side of the press plate which is claimed to extend beyond the rear end of the press plate so that grooves are formed in the seed bed. A seed distribution tube carries seed to a divider disposed behind the press plate which randomly divides the seed into two streams directing the seed to the sides of the seed bed and into the laterally spaced grooves. However it is known that in some soil conditions, particularly that known as heavy soil, more aggressive action is required to close the fertilizer furrow. If this furrow remains unclosed and no level seedbed is formed, then a large amount of seed falls into the fertilizer furrow rather than being placed to each side. Fertilizer too close to the seed is toxic to the seed as it germinates and they will die.

A similar hoe ground opener is disclosed in U.S. Pat. No. 4,674,419 by Kopecky. An auxiliary press plate is disclosed which has somewhat more aggressive wings for forming seed furrows. The press plate has a main flat central surface which in operation is also angled downwards and rearwards from a leading end to press down over a fertilizer furrow created by a preceding narrow opener. The wings have inner surfaces that taper laterally and downwardly from the central surface and outer surfaces that are generally vertical. The wings inner surfaces also converge toward the rear of the plate and thus in operation push some soil inwardly to close the fertilizer furrow. Such an arrangement of surfaces is more aggressive at closing a fertilizer furrow. However in conditions of heavy soil, when the soil is wet it tends to be bulldozed by opener surfaces that are too aggressive or restrict passage of the soil. The soil can bind to a furrow opener's surfaces. In these conditions ground tools do not properly cover the fertilizer furrow and seed and fertilizer are scattered ineffectively. A planting tools fertilizer delivery openings can even become blocked by soil that is pushed and builds up in front of the seed furrow forming surfaces. In fact, the Anderson patent discloses using low friction plastic as a press plate to prevent binding of soil. This can lead to a costly construction.

Flexicoil Ltd. also discloses furrow openers as shown on pages 45–47 of their Product Book (volume 2). Two different openers are promoted for use in different soil conditions. For heavy soil an HS paired row opener is promoted having a main central surface that runs level in operation, and wings that form a seed furrow on each side of a fertilizer furrow. Since the main surface runs level, it does not tend to restrict passage of heavy wet soils. It produces paired seed rows that are spaced apart about 2.5 inches. However if such an opener is made with wings more widely spaced for wider space between seed rows, it has been found that this shape may not perform aggressively enough to properly close the fertilizer furrow in all conditions. An LS paired row opener is promoted for use in light soils. It does not include a central pressing surface and rather the wing surfaces converge at a central edge forming bottom surfaces in an inverted V arrangement. The central edge runs generally horizontal. The wings also have leading surfaces that face slightly inward and downward for gathering soil and directing it inwards and downwards as it passes beneath the opener, closing the fertilizer furrow. This shape however has found to be too aggressive for heavy soils which becomes stuck between the wings.

In heavy wet soils particularly, the soil tends to bind to seeding tool surfaces between paired furrowing wings when those surfaces intersect at small obtuse angles or have little or no radius between them so the intersection forms a more distinct edge. Soil binding is more problematic especially when the intersection of the soil deflecting surfaces is angled or transverse to the direction of travel, and even when the angle between surfaces is moderately obtuse. Even with a surface smoothly curved, if there is significant concave curvature in a plane in the direction of travel, the soil tends to bind in the concavity.

It is desirable to have a paired row opener that works well without compromise in a broader range of soil conditions without fouling, and one which plants seed rows spaced widely while minimizing soil surface disturbance.

It is desirable to have these paired rows spaced sufficiently wide, closer to rows of adjacent tools, so there are not large spaces between rows planted by adjacent tools. Thus, during harvest there is an even stand of stubble to support a swath of cut crop above the ground for proper drying.

The prior art openers are generally quite narrow for seeding pairs of seed rows that are spaced quite closely. Seedbed forming portions of these planting tools generally operate within a space following a fertilizer furrow opening portion in which field trash has been cleared by the fertilizer opening portion. The seedbed forming portions therefor generally operate in soil that is substantially clear of field trash. An additional challenge in designing seedbed forming sections that form wider spaced paired rows is that a wider paired row opener will encounter field trash at it's outer edges which must not become caught on the opener, fouling it's operation.

SUMMARY OF THE INVENTION

A basic object of the invention is to provide an improved paired row opener that works well without compromise in a broader range of soil conditions without fouling, and one which plants seed rows spaced widely while minimizing soil surface disturbance.

Thus, in one aspect, the invention provides a ground engaging paired row furrow forming tool comprising: a tool body having fore and aft ends, an outer edge on each of two opposing sides of the tool body; a furrowing wing adjacent each of the opposing sides and protruding from bottom portions of the tool body; the tool body having lower surfaces including a central front surface portion which is angled upwards towards the fore end and a center passage being defined between the wings and which passageway is in part defined by a central rear surface portion which is substantially aligned fore to aft in a direction of travel T during operation of the ground engaging tool.

In a further aspect the invention provides a ground engaging paired row furrow forming tool comprising: a tool body having fore and aft ends, said body having surface portions defining an outer perimeter extending on each of two opposing sides of the tool body; a furrow forming wing adjacent each of the opposing sides and protruding in spaced apart relation from bottom portions of the tool body; said tool body having lower surfaces including a central front surface portion which is angled upwards towards the fore end and which leads into a central passage extending rearwardly of the tool body between the wings, which passage is capable of being substantially aligned fore to aft in a direction of travel during operation of the furrow forming tool.

Other features and advantages of the invention will become apparent from the following description of a preferred embodiment and the appended claims.

DETAILED DESCRIPTION OF PREFERRED EMBODIMENTS

Figure 8:
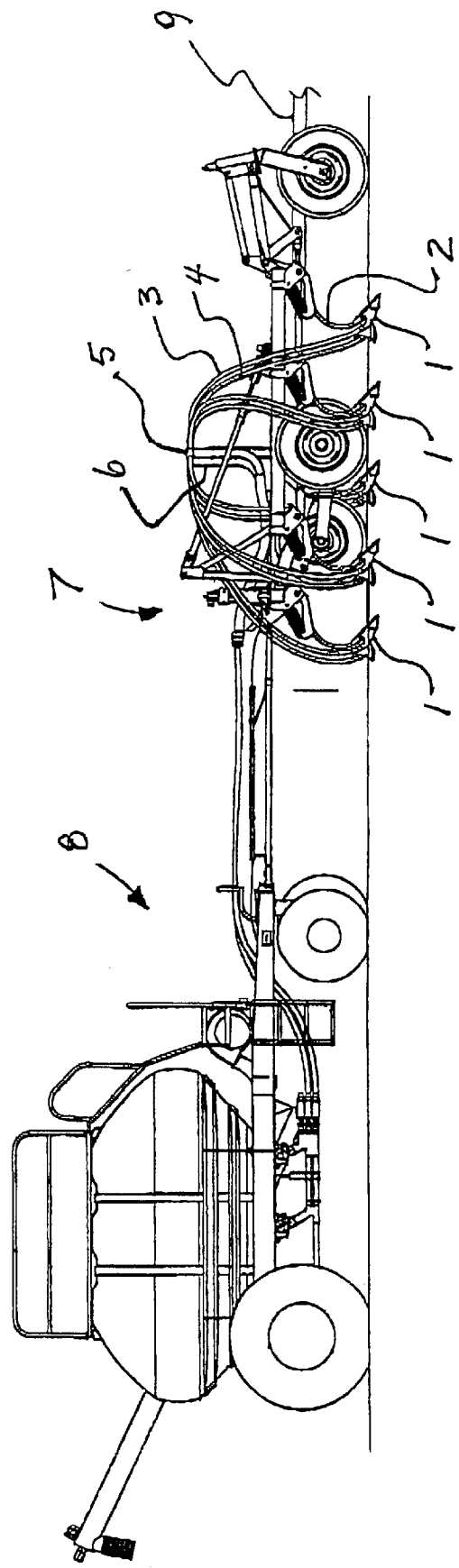
FIG. 8 shows agricultural implement on which a seeding tool as shown in FIG. 2 is typically used.

A hoe planting tool 1 has a mounting portion 14 for securing to a shank 2. A plurality of planting tools 1 and shanks 2 are typically attached to a tillage implement 7 to fore and aft spaced toolbars as can be seen in FIG. 8 with a plurality of them spaced transversely on each toolbar. The spaced arrangement is selected to allow the best passage of field trash between adjacent tools yet minimize soil ridging. Three to five toolbars are typically provided, depending on the spacing desired between planted rows. The implement 7 includes a hitch 9 for attachment to a vehicle such as a tractor for pulling the implement across a field. A product cart 8 can be towed behind the tillage implement 7, or alternately between the tractor and implement 7. The product cart delivers seed and fertilizer through distribution headers 5,6 and distribution lines 3,4 to the planting tools 1 for planting in the soil.

Figure 1:
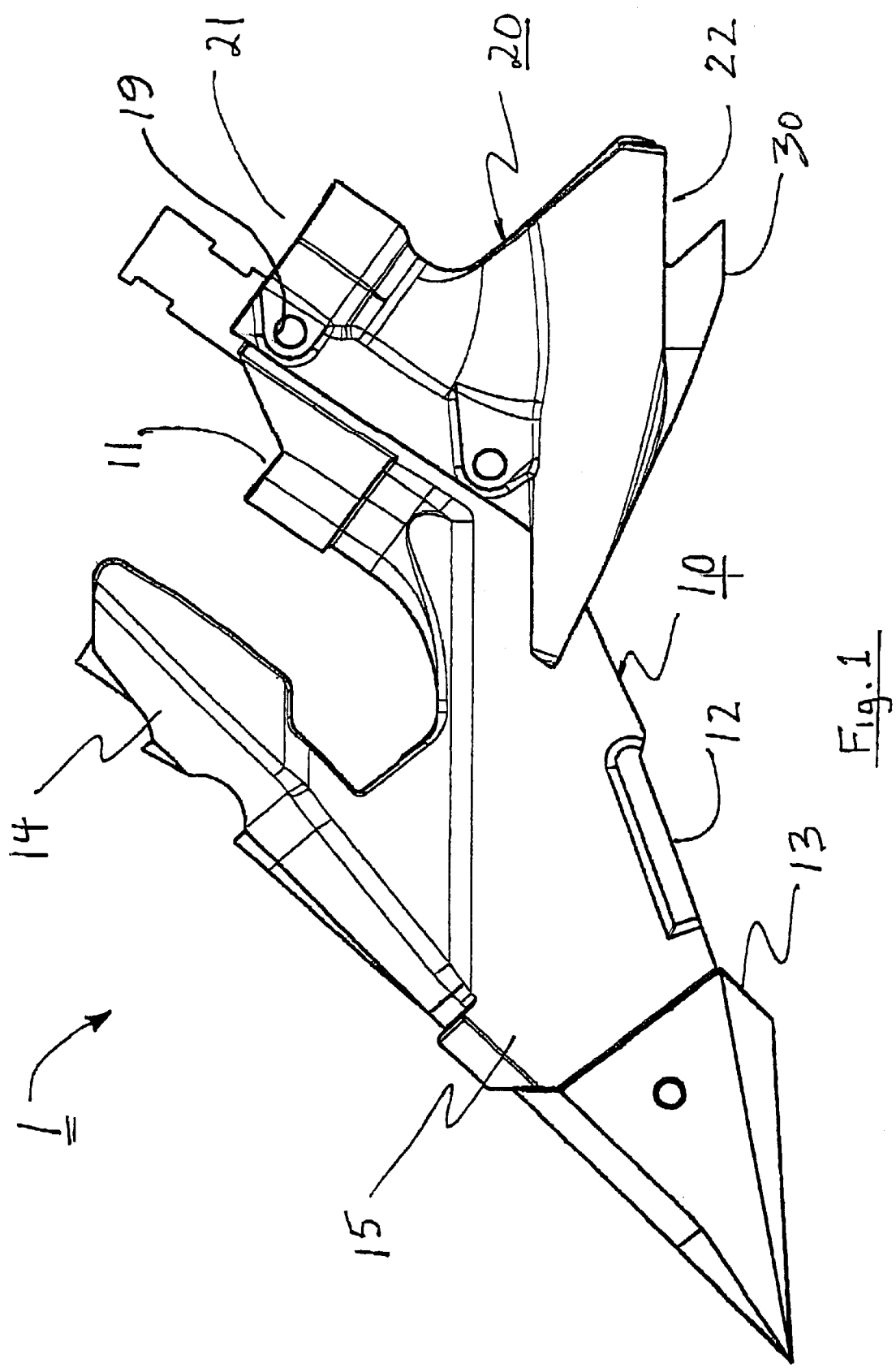
FIG. 1 is a side view of a hoe planting tool used for one pass fertilizing and paired row seeding.
Figure 1A:
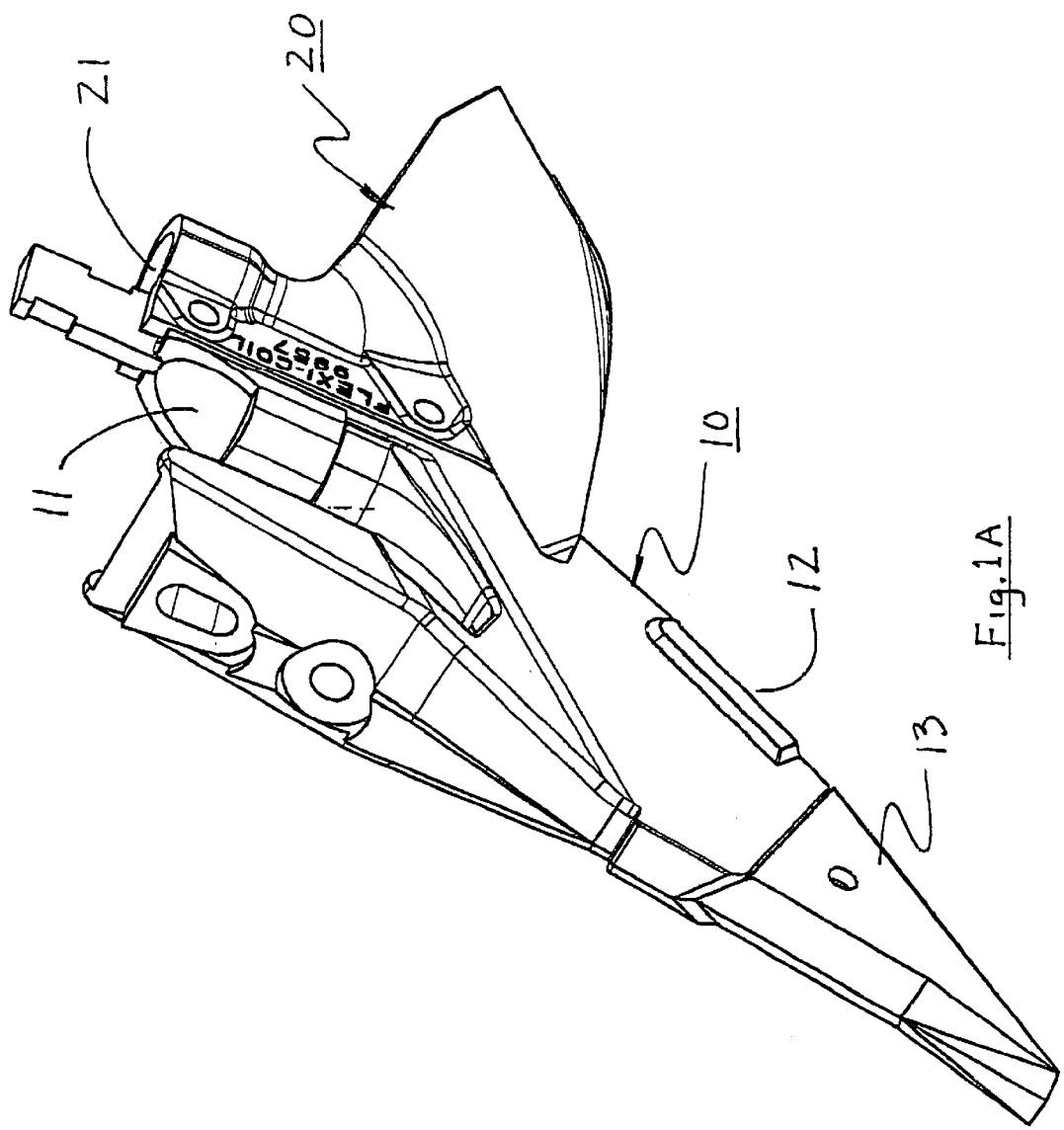
FIG. 1A is a perspective view of the planting tool in FIG. 1.

As seen in FIG. 1 the planting tool 1 comprises a narrow soil opener 10 and a paired row opener 20. Possibly these could be made as an integral opener, but narrow opener 10 is useful alone or in combination with other openers. The hoe planting tool 1 is a combination tool for one pass fertilizing and paired row seeding. It operates in the soil at a set depth controlled by the tillage implement 7. In such operation the soil opener 10 places fertilizer while the paired row opener 20 places seed. The opener 10 includes a furrowing tip 13 secured to the frontal lower body portion 15 of the opener 10. The upper body portion 14 of opener 10 is adapted for securing to a previously noted shank 2, in a well known manner. The opener 10 receives fertilizer at inlet 11 and directs it from a lower outlet 12 into a fertilizer furrow formed by furrowing tip 13.

Figure 4:
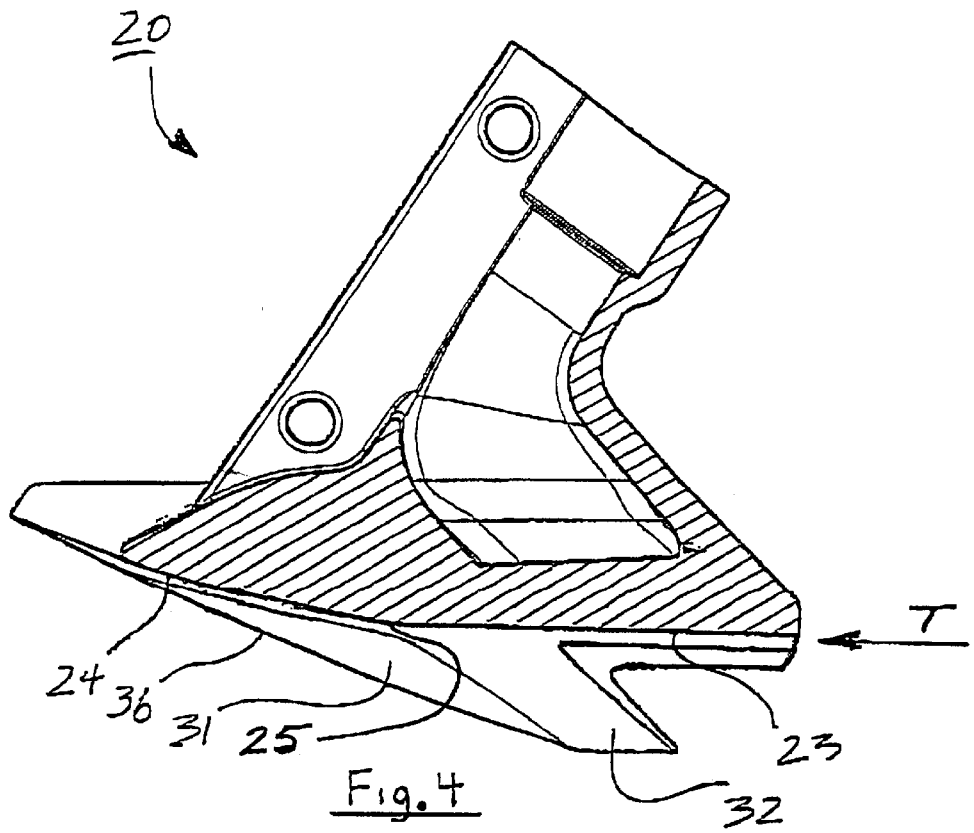
FIG. 4 is a view of a cross section taken through a line of symmetry of the seeding tool in FIG. 5.
Figure 5:
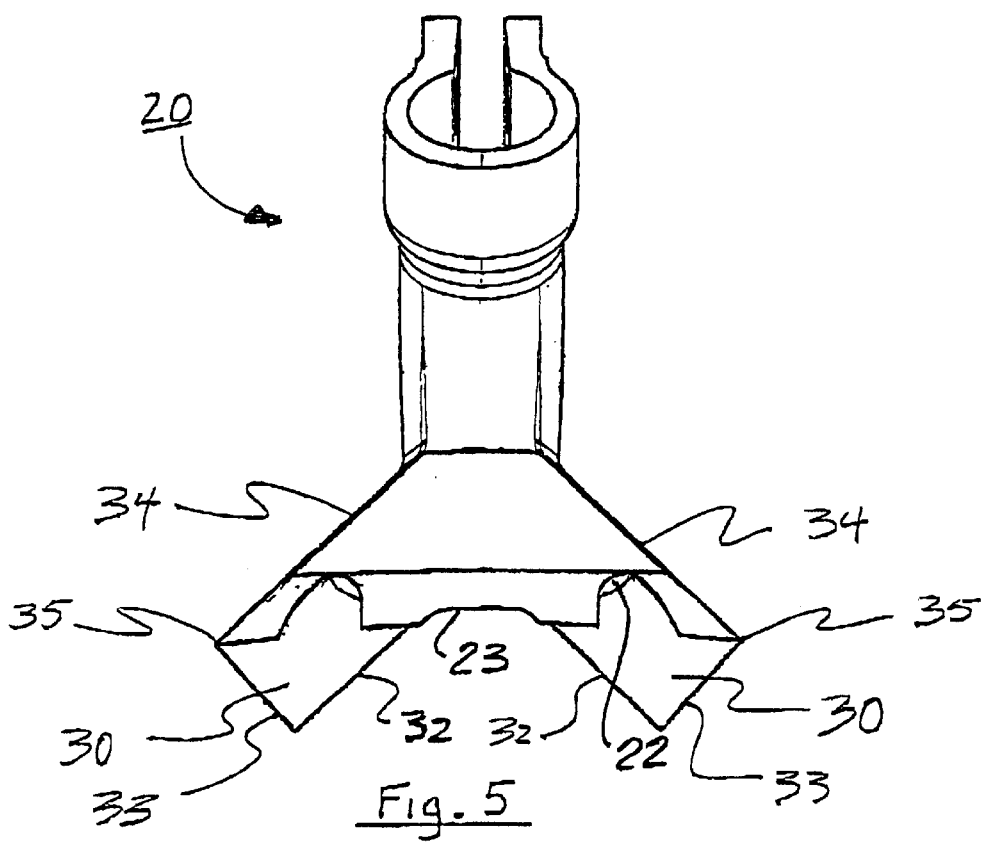
FIG. 5 is a rear view of the seeding tool in FIG. 2.
Figure 6:
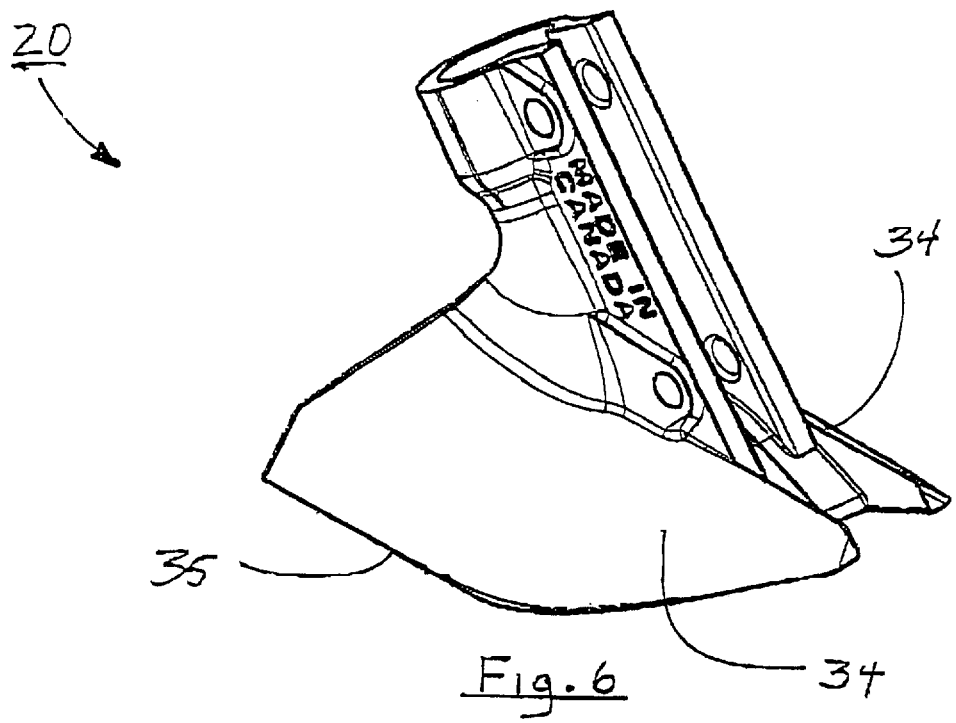
FIG. 6 is a top perspective view of the seeding tool in FIG. 2.

The paired row seeding tool 20 includes two furrowing wings 30 as best seen in FIGS. 4 and 5, protrude below the main body of seeding tool 20. Seeding tool 20 receives seed at an inlet 21 and directs it from outlets 22 into paired furrows formed by lower surfaces of wings 30. A passage from inlet 21 within seeding tool 20 divides into two passages having outlets 22 and randomly and evenly separates seed into a pair of streams to be placed in the paired furrows. The seeding tool 20 is fastened to the rear of the opener 10 by fasteners 19 in well-known manner.

The body of the seeding tool 20 generally includes lower surfaces and upper surfaces, certain of which converge together to form outer edges 35 extending along the left and right sides of the seeding tool. These outer edges 35 are curved inwardly and upwardly toward the front of the seeding tool 20. This curvature provides for shedding of field trash which might otherwise become caught on the seeding tool, in which event its operation is fouled and proper furrows are not formed. Left and right tool body upper surfaces 34 are angled upwards and inwards from outer edges 35 to the narrower central body of the seeding tool 20 and extend generally straight fore and aft in the direction of operation. Rearward portions of the outer edges 35 are straight and the seeding tool 20 is operated with these straight portions generally horizontal and at a depth in the soil at which the soil surface is at or above the edges 35 and along the upper surfaces 34. The upper surfaces 34 in operation slip below the soil surface with minimum disturbance of the soil surface.

Seeding tool 20 is also suitable in sizes that have a width exceeding the trash cleared zone created by the soil opener 10. The outwardly curved outer edges 35 prevent trash being pulled into and under the furrowing wings 30, and prevent trash from remaining caught on the edges 35. Moving along edges 35 from front to rear it will be seen that they gradually curve into general alignment with the direction of travel, so the parts of the outer edges 35 that are subject to field trash are generally aligned with the direction of travel and tend to shed off the trash.

Figure 3:
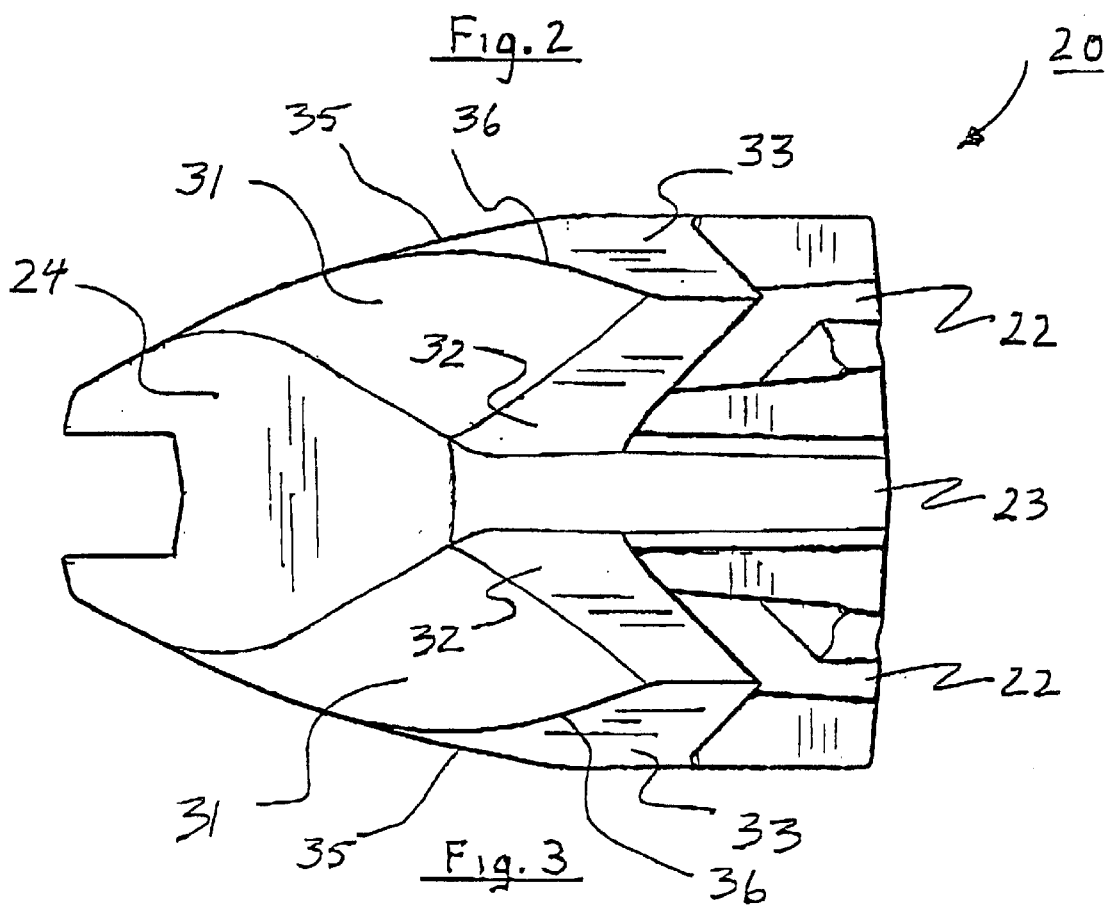
FIG. 3 is a bottom view of the seeding tool in FIG. 2.
Figure 7:
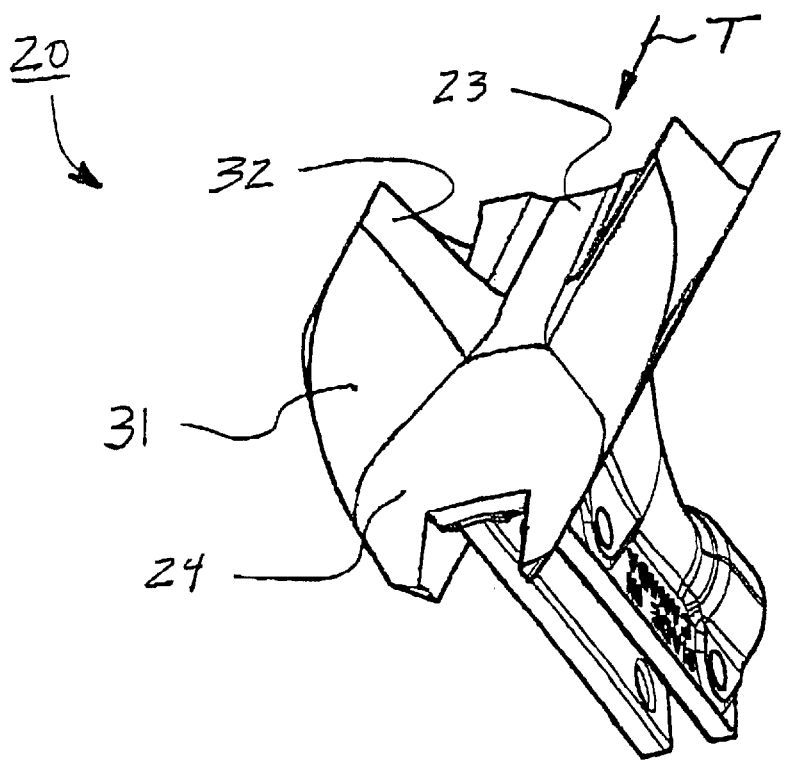
FIG. 7 is a bottom perspective view of the seeding tool in FIG. 2.

The bottom side of seeding tool 20 comprises a central surface, the profile of which can be seen in the cross section of FIG. 4. The central surface includes a central front portion 24 and a central rear surface portion 23 (FIG. 3) extending rearwardly therefrom in alignment with the direction of travel T. (FIGS. 3 and 7). Rear surface portion 23 is preferably at least about ¾ inch wide. The central rear surface 23 preferably is generally flat and level when in operation and the central front surface 24 is preferably angled slightly upwards and forwards relative to central rear surface 23. These surface portions 23, 24 are preferably blended together by a smoothly curved transition region 25 (FIG. 4) between them rather than having a distinct edge at which they intersect. This curvature is generally convex fore to aft and helps prevent soil from binding. The central front surface 24 presses soil downwards at a decreasing rate as it passes beneath the surface so that soil is not simultaneously subject to pressure from the wings 30 in a combination of forces that may otherwise cause relative movement of the soil to stall. The tool is normally oriented in operation so the central front surface 24 is angled upwards from the horizontal. There is preferably about ⅜ inch rise in the central front surface 24 from the rear to the front edge.

A furrow forming wing 30 as previously noted is positioned to each side of the central surfaces 23, 24 as seen in FIG. 3 and FIG. 5. Each wing 30 includes a forward lower surface 31, an inner surface 32, and an outer surface 33. The dihedral angle between inner surfaces 32 of wings 30 is shown as being approximately 90° although this angle can be varied somewhat. The wing forward surfaces 31 are arranged in flanking relation to the central front surface 24 and each surface 31 extends laterally, rearwards and downwards from the central front surface 24. The forward surfaces 31 are therefore inclined such as to slightly face each other, and they taper inwards and rearwards so in operation they direct some soil inwards and downwards over the fertilizer furrow formed by the soil opener 10. The wing inner surfaces 32 extend outwards and downwards from the central rear surface 23, and intersect with the forward surface 31. The wing outer surfaces 33 extend inwards and downwards from outer edges 35 to intersect with surfaces 31 and 32 and defining furrows forming edges 36 which are angled inwardly from fore to aft before reaching the extension edges 36, which are parallel to each other and to the travel direction T. In FIG. 5 rear view it can be seen that wing inner surfaces 32 and outer surfaces 33 converge to form V-shape profiles which operate to form corresponding V-shaped furrows. The tips of the V-shapes (which are defined by the extension edges 36) are preferably spaced apart, at least about 3 inches. The wing inner and outer surfaces 32, 33 extend generally parallel to the direction of travel T thus giving the wings 30 a longer wear life in which they maintain their furrow forming profile. A forward part of each wing outer surface 33 is curved to follow the associated curved outer edge 35. Preferably the forward surface 31 is curved toward the rear to blend with inner surface 32 so there is no distinct edge along the intersection of these surfaces. The central front and rear surfaces 23, 24 also blend along curved intersections with wing forward surfaces 31 and wing inner surfaces 32 so there are no distinct edges of intersection. This promotes smooth soil flow and prevents soil binding which often is evident where surface intersect at edges, particularly at sharper angles.

Figure 2:
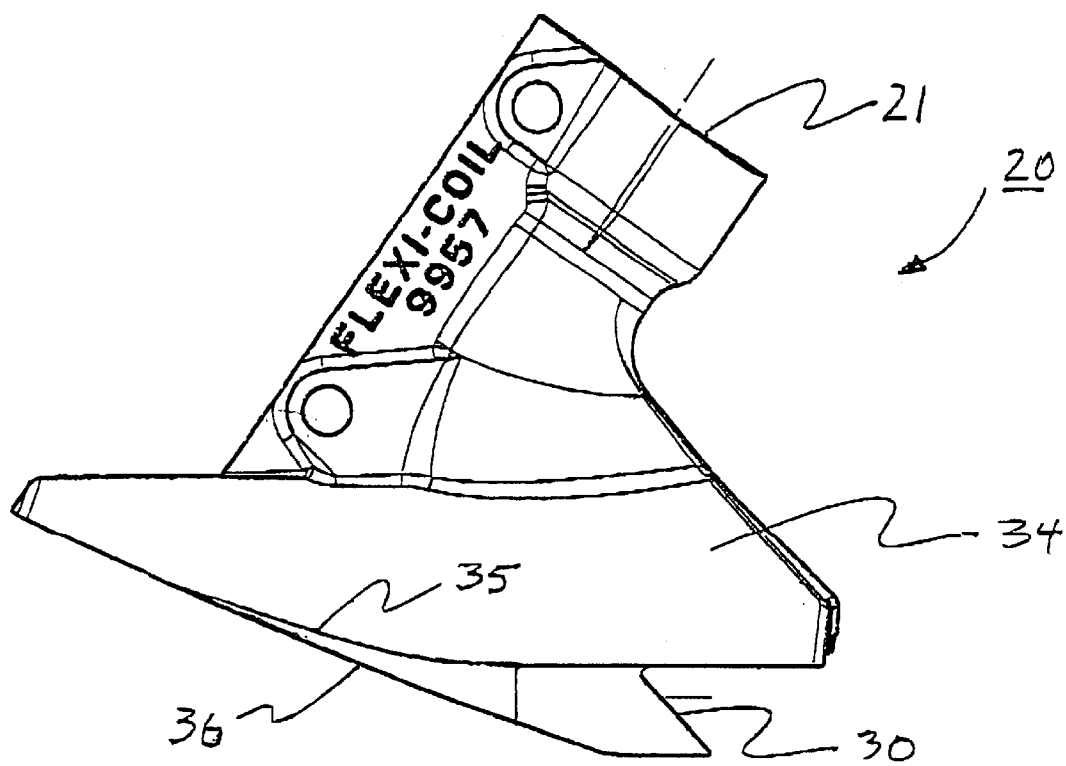
FIG. 2 is a side view of a paired row furrowing and seeding tool.

The edges 36 of the forward surfaces 31 appear as substantially straight in a side profile as can be seen in FIG. 2 and FIG. 4. This is generally the same across the forward surfaces 31 and through the intersections with the central front surface 24 so that there is little to no concave curvature or angles in a plane in the direction of travel, in which soil can hang up and bind. Central rear surface 23 provides a free central passage between wings 30 where the soil is not simultaneously subject to downward deflection as the V-shaped furrows are being formed. Preferably the central rear surface 23 provides a space of about ¾ inch minimum between the bases of the wings 30 to provide a free passage for soil flow. (This is in contrast to certain prior art designs in which a surface between furrow forming wings continues to deflect soil downwards during furrow formation.) A small fillet or radius is formed between the wing surfaces 32 and central rear surface 23 to provide free passage of soil.

Seed passage outlets 22, best seen in FIG. 5, are positioned behind each wing 30 with the outlets terminating above the lowermost edge 36 of each wing, preferably a distance of ¾ inch, which provides good control of material placement and prevents soil from blocking the outlets.

In operation, the seeding tool 20 is generally oriented with central rear surface 23 substantially horizontal (see FIG. 4). It may be slightly trimmed from this orientation with central rear surface 23 angled one or two degrees upward or downward from front to rear, depending on soil conditions. This can be achieved by adjusting a stop on a tripping device supporting the shank 2, or by using shims in mounting the ground engaging tool 1 to change its angle relative to the shank 2.

Although the present invention has been described with reference to preferred embodiments, those skilled in the art will recognize that changes may be made without departing from the spirit and scope of the invention.

What is claimed is:

1. A ground engaging paired row furrow forming tool comprising:
   a tool body having fore and aft ends, said body having surface portions defining an outer perimeter extending on each of two opposing sides of the tool body;
   a furrow forming wing adjacent each of the opposing sides and protruding in spaced apart relation from bottom portions of the tool body, each wing having an outer surface extending downwards and inwards from the outer perimeter; and, a forward surface extending from the central front surface downwards and outwards to intersect with the outer surface at a furrow forming edge; and
   said tool body having lower surfaces including a central front surface portion which is angled upwards towards the fore end and which leads into a central passage extending rearwardly of the tool body between the wings, which passage is capable of being substantially aligned fore to aft in a direction of travel during operation of the furrow forming tool.

2. The tool as in claim 1 in which each wing further includes an inner surface extending from the forward surface toward the aft end substantially in the direction of travel T during operation.

3. The tool as in claim 1 including a central rear surface defining a space between a base of the wings where they begin to protrude from the bottom portions of the tool body, and thus defining with said wing inner surfaces the central passage.

4. The tool as in claim 3 wherein each wing includes a furrow-forming edge, said edges being parallel to each other.

5. The tool as in claim 4 wherein said edges are spaced apart at least about 3 inches.

6. The tool as in claim 4 wherein said central rear surface is generally flat at least toward the aft end.

7. The tool as in claim 6 wherein said central rear surface has a width of at least approximately ¾ inch.

* * * * *